United States Patent
Rass et al.

(10) Patent No.: US 8,213,656 B2
(45) Date of Patent: Jul. 3, 2012

(54) ENERGY STORAGE MEANS HOLDING DEVICE HAVING COVERED CHARGING CONTACTS AND A HOUSING MODULE

(75) Inventors: Uwe Rass, Nürnberg (DE); Joseph Sauer, Strullendorf (DE); Benjamin Schmidt, Nürnberg (DE); Christian Schmitt, Grossenseebach (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 713 days.

(21) Appl. No.: 12/317,060

(22) Filed: Dec. 18, 2008

(65) Prior Publication Data

US 2009/0161898 A1    Jun. 25, 2009

(30) Foreign Application Priority Data

Dec. 20, 2007 (DE) .......................... 10 2007 061 591

(51) Int. Cl.
*H04R 25/00* (2006.01)
*H02J 7/00* (2006.01)

(52) U.S. Cl. ........................................ 381/323; 320/107

(58) Field of Classification Search .................... 381/323
See application file for complete search history.

(56) References Cited

U.S. PATENT DOCUMENTS

| 5,586,188 | A * | 12/1996 | Renggli et al. ................ 381/328 |
| 6,265,100 | B1 | 7/2001 | Saaski et al. |
| 6,356,053 | B1 | 3/2002 | Sandoz et al. |
| 2001/0036288 | A1* | 11/2001 | Robinson et al. ............. 381/323 |
| 2004/0120540 | A1* | 6/2004 | Mullenborn et al. ......... 381/322 |

FOREIGN PATENT DOCUMENTS

| DE | 4309116 A1 | 9/1994 |
| DE | 19601231 A1 | 7/1997 |
| DE | 19749110 A1 | 8/1998 |
| DE | 102005060977 A | 6/2006 |
| EP | 0681412 A2 | 11/1995 |

* cited by examiner

*Primary Examiner* — Jerome Jackson, Jr.

(57) ABSTRACT

An energy storage means holding device and an associated housing module for a hearing device are provided. The holding device includes a holding module and a contact arranged in the holding module for connection to an energy charging device. A gripping is embodied in the holding module and cover the contact such that the contact can be contacted outside but cannot however be reached by human fingers when inserting the holding device into a housing module of the hearing device.

19 Claims, 3 Drawing Sheets

ENERGY STORAGE MEANS HOLDING DEVICE HAVING COVERED CHARGING CONTACTS AND A HOUSING MODULE

CROSS REFERENCE TO RELATED APPLICATIONS

This application claims priority of German application No. 10 2007 061 591.6 filed Dec. 20, 2007, which is incorporated by reference herein in its entirety.

FIELD OF INVENTION

The invention relates to an energy storage means holding device as and having contact means arranged in a holding module as well as a housing module.

BACKGROUND OF INVENTION

For operational purposes, hearing devices require an energy source to supply the electrical components. Hearing devices are thus generally provided with batteries as energy storage means. To avoid a time-consuming and costly exchange of the batteries, rechargeable batteries, so-called accumulators, are frequently used. In order to charge the accumulators, these must either be removed from the hearing device and connected to a battery charging station, or, in an installed state, they can be charged inductively or galvanically by way of coils or contacts.

Patent specification DE 10 2005 060 977 A1 discloses the need for a terminal on the exterior of a hearing device in order to charge a battery in the case of a hearing device of the so-called touch-type. As the terminal may corrode as a result of water, a non-touch type is preferably used, in other words inductive recharging.

SUMMARY OF INVENTION

The disadvantage of inductive charging is on the one hand the coils needed in the hearing device, which cause space problems particularly in the case of in-the-ear hearing devices, and on the other hand, the restricted power transmission, so that a complete recharging process can last a long time.

It is thus the object of the invention to overcome these disadvantages and to specify a device, which on the one hand allows a rapid charging of an energy storage means, in particular a battery, and on the other hand prevents corrosion of freely arranged contacts.

BRIEF DESCRIPTION OF THE DRAWINGS

In accordance with the invention, the set object is achieved with the devices of the independent claims.

DETAILED DESCRIPTION OF INVENTION

Figure 1:
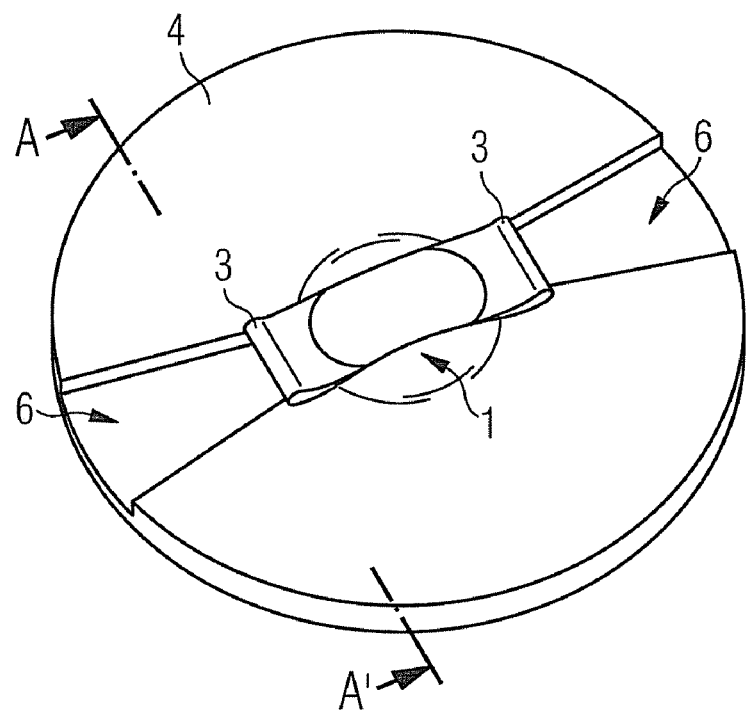

In accordance with the invention, the device includes an energy storage means holding device for a hearing device. It includes a holding module and at least one contact means arranged in the holding module for connection to an energy charging device. Gripping elements which cover the contact means are embodied in the holding module, such that when the holding device is inserted into a housing module of the hearing device, the contact means can be contacted from the outside but cannot however be reached by human fingers.

This is advantageous in that the contact means are protected against corrosion as a result of humidity due to contact by fingers and are not visible from the outside when the hearing device is inserted in the auditory canal.

In one development, the holding device can be a battery charger for receiving a rechargeable battery.

As a result, accumulators can be used in hearing devices.

In a further embodiment, the holding module can include a cover including the gripping elements, with the side of the cover facing outwards, excluding the gripping elements, passing continuously into the surface of the housing module when the holding device is inserted into the housing module.

The smooth surface is advantageous here in that it prevents dirt from settling.

In one development, the cover can be arched outwards.

As a result, a battery charging device can be connected more easily.

In a further embodiment, the gripping elements can be embodied so as to be toric and/or arched upwards and can be arranged symmetrically.

This is advantageous in that the holding device is able to grip easily and reliably.

In one development, the two gripping elements are embodied such that a contact means is arranged under the one gripping element and two contact means are arranged under the other gripping element.

This is advantageous in that polarity reversal cannot result when connecting a battery charging device.

In a further embodiment, the contact means can be integrated in the surface of the holding module.

As a result, the contact means are fixedly positioned in the holding module and can end in a planar fashion with the surface of the holding module.

A housing module for accommodating an inventive holding device is also specified, with which the housing module has recesses below the gripping elements and at least in the region of the contact means.

This is advantageous in that the contact means can be reached from the outside with contact devices but cannot be touched by the fingers of an operator or hearing device wearer.

In one development, the housing module can have a front plate with two recesses, with the recesses continuing to the edge of the front plate.

As a result, the contact elements can be reliably contacted.

A hearing device with an inventive holding device and with an inventive housing module is also specified.

Figure 2:
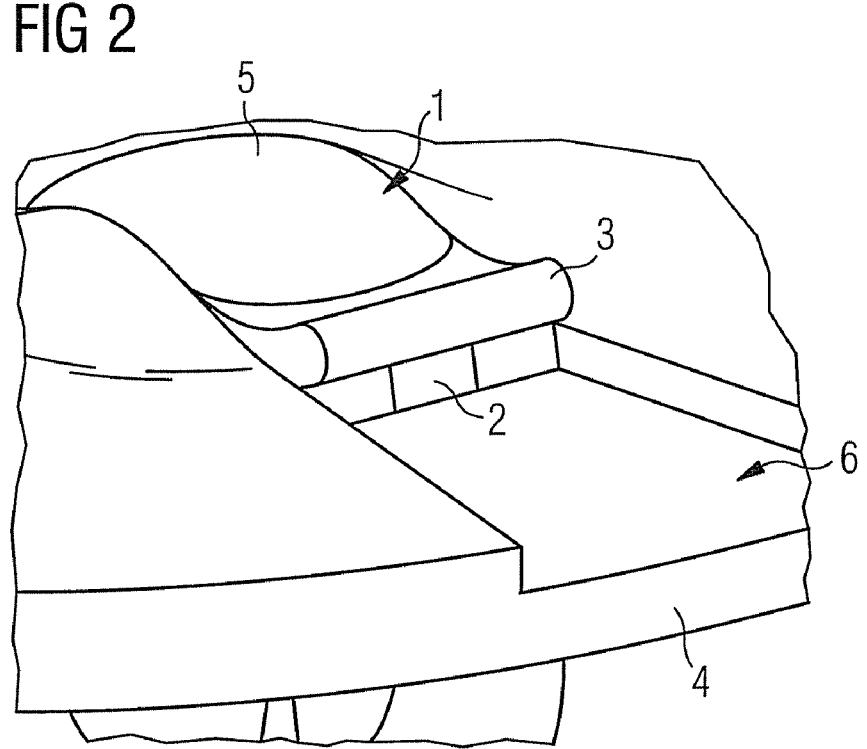
Figure 3:
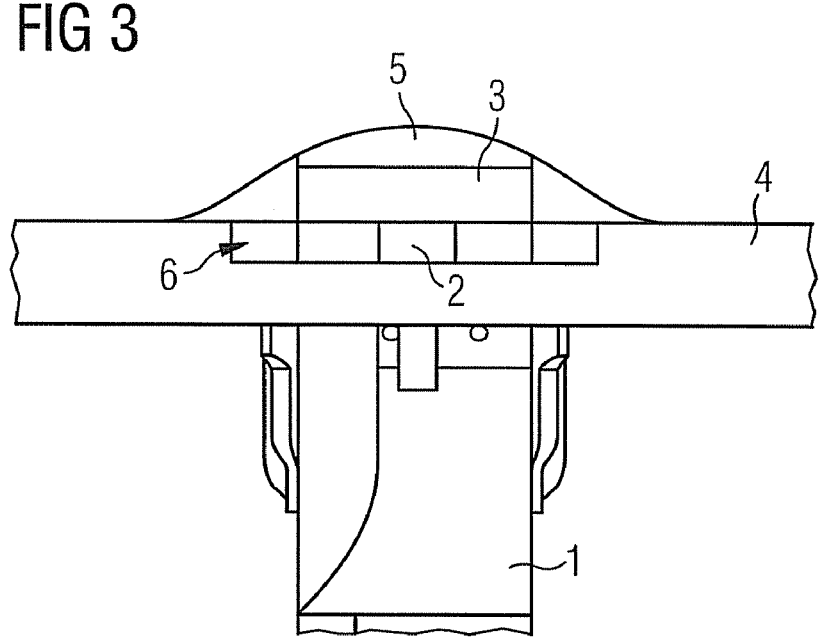
Figure 4:
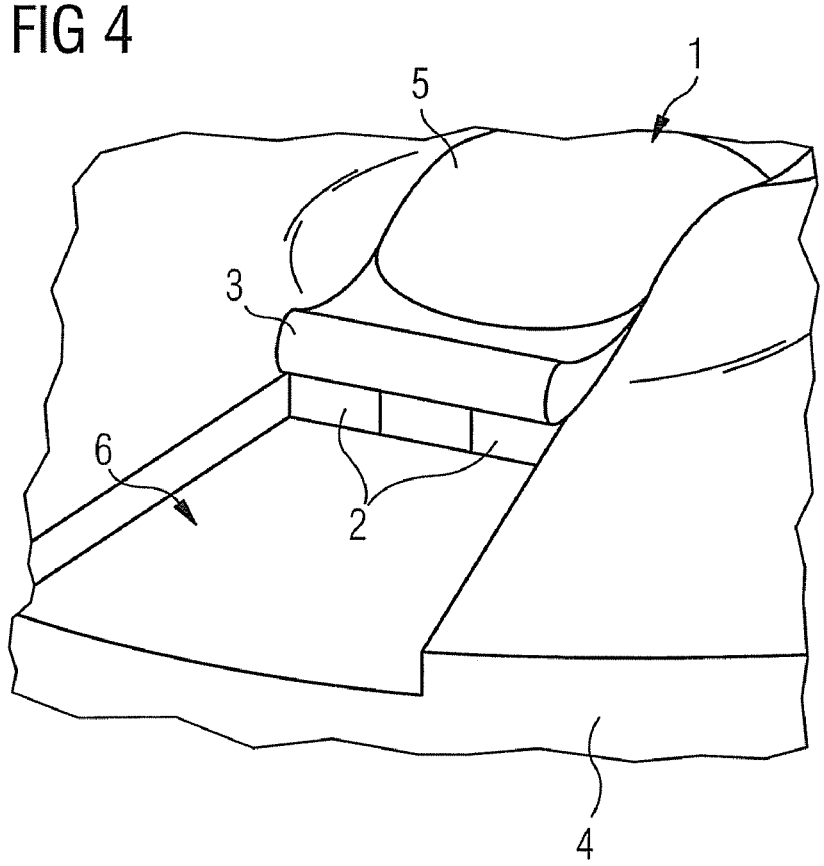
Figure 5:
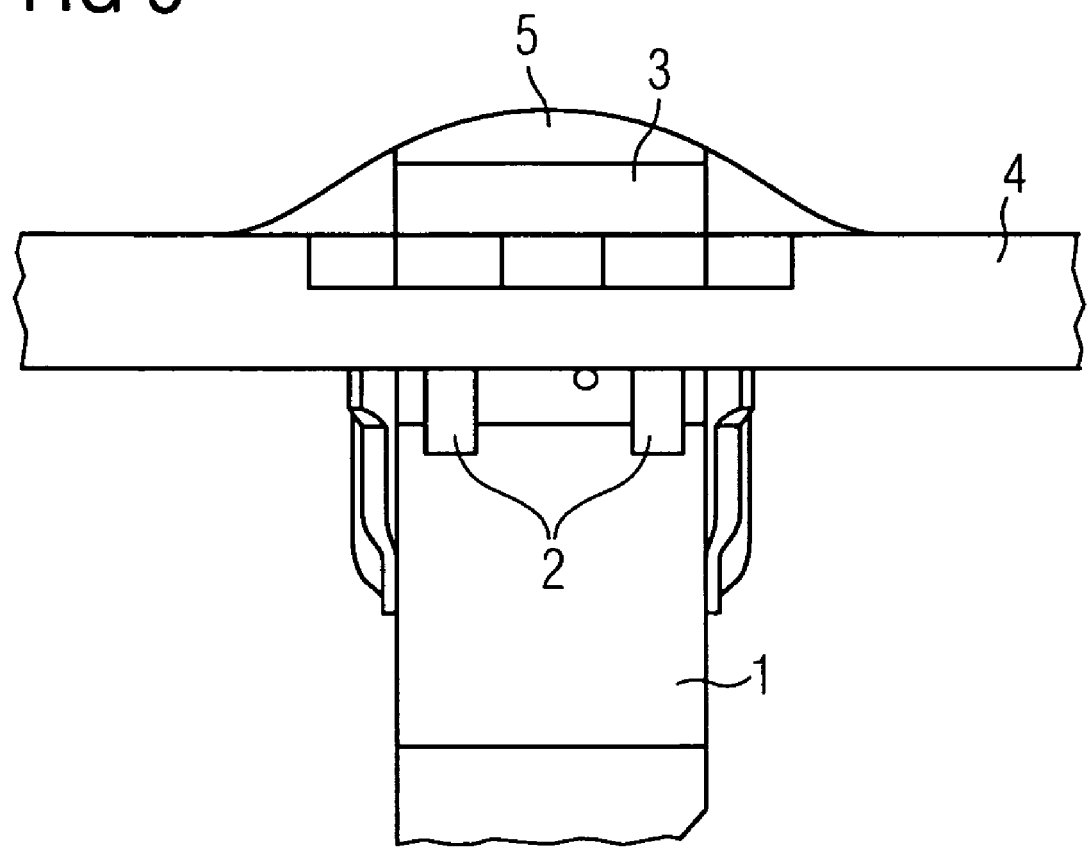

Further details of the invention are apparent from the descriptions which follow of an exemplary embodiment with reference to schematic drawings, in which;

FIG. 1: shows a front plate with an energy storage means holding device,

FIG. 2: shows a detailed view of a front plate with an energy storage means holding device, FIG. 3: shows a cross-sectional view of a front plate with an energy storage means holding device, FIG. 4: shows a further detailed view of a front plate with an energy storage means holding device and FIG. 5: shows a further cross-sectional view of a front plate with an energy storage means holding device.

FIG. 1 shows a perspective view of a front plate 4 as a housing module of an in-the-ear hearing device (otherwise not shown). An opening, in which a holding module 1 with two toric grippers 3 is inserted as a gripping element, is located in the front plate 4. The front plate 4 and the holding module 1 form a unit in the inserted position, with the surfaces passing almost seamlessly into one another, without grades and gaps. The central region of the holding module 1 which is visible from the outside and the central region of the front plate 4 are outwardly embossed and/or mushroom-shaped for aesthetic reasons and/or to ensure easier insertion into a charging device. Symmetrically arranged recesses 6 are apparent in the front plate 4. Contact means 2 are arranged below the grippers 3, not visible from above.

FIG. 2 shows a perspective detailed view of a front plate 4 with a holding module 1 inserted herein as seen in FIG. 1. The upper part of the holding module 1 forms a cover 5, in which two handles 3 are embodied symmetrically. A contact means 2 is visible in the side wall of the holding module 1, said contact means being embedded in the surface of the holding module 1. The contact means 2 is arranged symmetrically to the boundary of the holding module 1. It can however assume any position, provided it can be contacted from the outside by way of contacts. In order to be able to actually reach the contact means 2, a recess 6 is embodied in the front plate 4. The recess 6, a depression in the front plate 4, ends inside with the opening for the holding module 1 and has a width which corresponds to the width of the handle 3 and/or which corresponds to the width of the holding module 1. The recess 6 has a thickness, which is a function of the size of the handle 3 as well as a secure grip of the handle 3 by a hearing device wearer or hearing device acoustician. The recess 6 is ideally so thick that the users' fingers cannot reach the contact means 2. The recess 6 extends toward the edge of the front plate 4 for primarily aesthetic reasons.

FIG. 3 shows a sectional view of the front plate 4 from FIG. 1 along the connection A A'. The contact means 2 of the holding module 1 is clearly apparent. The contact means 2 is protected by the handle 3 of the cover 5 of the holding module 1 from contact from a human finger. The front plate 4 with its recess 6 uncovers so much of the surface of the contact means 2 that a battery charging device can be reliably connected for instance.

Like FIG. 2, FIG. 4 shows a detailed view of a front plate 4 with an inserted housing module 1. In contrast to FIG. 2, two contact means 2 are however integrated in the holding module 1 in FIG. 4. A battery in the holding module 1 can be charged by way of the contact means 2 and/or the battery voltage can be measured. Another layer of the contact means 2 which is opposite to FIG. 2 prevents reverse polarity during the charging process. The cover 5 of the holding module 1 is in turn outwardly arched and passes continuously into the front plate 4.

FIG. 5 shows a sectional view similar to that in FIG. 3. The sectional view through a front plate 4 according to FIG. 4 is such that the contact means 2 and the handle 3 can be easily seen. In contrast to FIG. 3, in FIG. 5 two contact elements 2 are integrated below the handle 3 of the cover 5 in the holding module.

Instead of a battery, another energy storage means, for instance a fuel cell, can be used in further embodiments.

The invention claimed is:

1. A holding device for an energy storage device of a hearing device, comprising:
    a holding module having a side wall, wherein the holding module is inserted into a housing module of the hearing device wherein the housing module includes a recess;
    a contact element arranged in the side wall for connection to an energy charging device;
    a plurality of gripping elements arranged in the holding module wherein the gripping elements extend in a direction transverse to the side wall and above the contact element and wherein a gripping element and the recess form an opening having a depth,
    wherein the gripping element is sized such that the depth of the opening enables access to the contact element for connection to the energy charging device from the outside while not enabling access to the contact element by a user's finger.

2. The holding device as claimed in claim 1, wherein the holding device is a battery charger for receiving a rechargeable battery.

3. The holding device as claimed in claim 1,
    wherein the holding module includes a cover that includes the gripping element, and
    wherein a side of the cover which faces outwards, excluding the gripping elements, passing continuously into the surface of the housing module when the holding device is inserted into the housing module.

4. The holding device as claimed in claim 3, wherein the cover is arched outwards.

5. The holding device as claimed in claim 1, wherein the gripping elements are toric.

6. The holding device as claimed in claim 1, wherein the gripping elements are arched upwards.

7. The holding device as claimed in claim 1, wherein the gripping elements are arranged symmetrically.

8. The holding device as claimed in claim 1, wherein two gripping elements include a first gripping element and a second gripping element, wherein a contact element is arrange below the first gripping element and two contact elements are arranged below the second gripping element.

9. The holding device as claimed in claim 1, wherein the contact element is integrated in the surface of the holding module.

10. A housing module for a hearing device, comprising:
    a recess for receiving a holding device, the holding device including a holding module having a side wall which includes a contact element for connection to an energy charging device,
    a plurality of gripping elements arranged in the holding module wherein the gripping elements extend in a direction transverse to the side wall and above the contact element and wherein a gripping element and the recess from an opening having a depth,
    wherein when inserting the holding device into the housing module of the hearing device the gripping element is sized such that the depth of the opening enables access to the contact element for connection to the energy charging device from the outside while the opening does not enable access to the contact element by a user's finger and the recess is below the gripping elements after the insertion.

11. The housing module as claimed in claim 10, wherein the housing module is a front plate with two recesses, with each of the recesses continuing up to the edge of the front plate.

12. A hearing device, comprising:
    a holding device for an energy storage device of a hearing device, the holding device comprising:
        a holding module having a side wall,
        a contact element arranged in the side wall for connection to an energy charging device, and
        a plurality of gripping elements arranged in the holding module wherein the gripping elements extend in a direction transverse to the side wall and above the contact element;
    a housing module comprising a plurality of recesses arranged below the gripping elements of the holding device when the holding device is inserted into the housing module wherein the gripping elements and recesses each for an opening having a depth, wherein the gripping elements are sized such that the depth of each opening enables access to the contact element for connection to the energy charging device from the outside while not enabling access to the contact element by a user's finger.

13. The hearing device as claimed in claim 12, wherein the holding device is a battery charger for receiving a rechargeable battery.

14. The hearing device as claimed in claim 12, wherein the holding module includes a cover that includes the gripping element, wherein a side of the cover which faces outwards, excluding the gripping elements, passing continuously into the surface of the housing module when the holding device is inserted into the housing module.

15. The hearing device as claimed in claim 12, wherein the cover is arched outwards.

16. The hearing device as claimed in claim 12, wherein the gripping elements are toric.

17. The hearing device as claimed in claim 12, wherein the gripping elements are arched upwards.

18. The hearing device as claimed in claim 12, wherein the gripping elements are arranged symmetrically.

19. The hearing device as claimed in claim 12, wherein the contact element is integrated in the surface of the holding module.

* * * * *